United States Patent
Roth (10) Patent No.: US 11,461,569 B2
(45) Date of Patent: Oct. 4, 2022

(54) RFID READER FOR GARMENTS ON HANGERS

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/214,111

(22) Filed: Dec. 9, 2018

(65) Prior Publication Data

US 2019/0205582 A1    Jul. 4, 2019

Related U.S. Application Data

(60) Provisional application No. 62/611,677, filed on Dec. 29, 2017.

(51) Int. Cl.
*G06K 7/10*    (2006.01)
*G06K 19/07*   (2006.01)
(Continued)

(52) U.S. Cl.
CPC ..... *G06K 7/10445* (2013.01); *G06K 7/10435* (2013.01); *G06K 19/0723* (2013.01); *G06K 19/07773* (2013.01); *B65G 9/002* (2013.01)

(58) Field of Classification Search
CPC ........... G06K 7/10445; G06K 7/10435; G06K 19/0723; G06K 19/07773; B65G 9/002
(Continued)

(56) References Cited

U.S. PATENT DOCUMENTS

| 7,642,917 B2 * | 1/2010 | Tran ................... G06K 7/10435 |
| | | 340/572.7 |
| 7,876,220 B2 * | 1/2011 | Aldridge ................. D06F 93/00 |
| | | 340/568.1 |

(Continued)

FOREIGN PATENT DOCUMENTS

| DE | 102004055931 | 6/2006 |
| DE | 202013004511 | 8/2014 |

OTHER PUBLICATIONS

International Search Report and Written Opinion dated Apr. 3, 2019 issued in corresponding IA No. PCT/US2018/064640 filed Dec. 9, 2018.
(Continued)

*Primary Examiner* — Daniel A Hess (57) ABSTRACT

A radio frequency identification (RFID) apparatus includes a housing, an RFID reader, and one or more RFID antennas disposed in the housing. The housing includes a first opening, a second opening, and a tunnel between the first and second openings. The housing is configured to be disposed over a track configured to transport a garment on hanger through the tunnel. The RFID antennas are configured to generate a first RFID signal substantially in the tunnel to interrogate an RFID tag associated with a garment on hanger as it transits through the tunnel. The RFID reader receives a second RFID signal transmitted by the RFID tag in response to receiving the first RFID signal. The RFID apparatus can include a segment of the track. The track can include a trolley configured to secure one or more garments on hangers. The trolley can include an RFID tag.

7 Claims, 6 Drawing Sheets

(51) Int. Cl.
*G06K 19/077* (2006.01)
*B65G 9/00* (2006.01)

(58) Field of Classification Search
USPC ......................................................... 235/451
See application file for complete search history.

(56) References Cited

U.S. PATENT DOCUMENTS

| | | | |
|---|---|---|---|
| 9,760,826 B1* | 9/2017 | Stine | G06K 19/07773 |
| 2006/0170556 A1* | 8/2006 | Fang | G06K 7/10336 |
| | | | 340/572.7 |
| 2006/0177291 A1 | 8/2006 | Kienzl et al. | |
| 2008/0116273 A1* | 5/2008 | Aldridge | D06F 93/00 |
| | | | 235/439 |
| 2008/0116274 A1 | 5/2008 | Aldridge | |
| 2008/0156705 A1* | 7/2008 | Markman | B07C 5/34 |
| | | | 209/552 |
| 2012/0212327 A1* | 8/2012 | Torabi | G06K 7/10099 |
| | | | 340/10.1 |
| 2014/0339297 A1 | 11/2014 | Bremer | |
| 2018/0053240 A1* | 2/2018 | Jones | G06Q 10/083 |
| 2018/0174421 A1* | 6/2018 | Jones | G01J 5/0859 |

OTHER PUBLICATIONS

International Preliminary Report on Patentability dated Jul. 9, 2020 issued in corresponding IA No. PCT/US2018/064640 filed Dec. 9, 2018.

* cited by examiner

RFID READER FOR GARMENTS ON HANGERS

CROSS REFERENCE TO RELATED APPLICATION(S)

The present application claims priority to and the benefit of United States provisional utility patent application No. 62/611,677 filed Dec. 29, 2017, which is incorporated herein by reference in its entirety.

TECHNICAL FIELD

The subject application generally relates to radio frequency identification ("RFID") readers and, more specifically, to RFID readers configured to read RFID tags attached to garments on hangers.

BACKGROUND

Radio Frequency Identification ("RFID") systems typically operate in one of several frequencies such as low frequency ("LF"), nominally 125 kHz to 134 kHz, high frequency ("HF"), nominally 13.56 MHz, and ultra-high frequency ("UHF"), nominally 433 Mhz or 860 MHz to 960 MHz. RFID transponders may include an antenna and/or tuning loop coupled to an RFID chip. The RFID chip receives power when excited by a nearby electromagnetic field oscillating at the resonant frequency of the RFID chip. When the RFID chip receives sufficient power, the RFID chip turns on and sends a coded return signal via the antenna or tuning loop. An RFID reader in proximity to the RFID transponder receives and decodes the coded return signal from the RFID transponder.

The apparel industry packs, ships, and presents for sale garments on hangers ("GOH"). For example, such GOH apparel can include, but is not limited to, men's suits or women's dresses where folding of the garments and packaging in cartons is not practical or feasible. For example, some materials used in these types of apparel are not conducive to being folded such as garments that normally would be processed as dry clean only. Packaging such garments in cartons can create additional work processes in the supply chain as each item needs to be unpacked, a hanger inserted, hung on a rack, and re-pressed or steamed to make the unpacked item presentable for sale to the end consumer. These additional steps can be labor intensive and significant labor cost can be associated with performing these tacks. For these and other reasons, the apparel industry generally prefers to prepare and transport these items as garments on hangers straight from the point of manufacture, rather than incur the aforementioned additional steps.

However, garments on hangers require special handling methods throughout the supply chain. For example, some manufacturers design and construct very large wooden crates, such as, for example, roughly 8'×8'×8' cubes, that can allow individual items to be hung on racks suspended between the interior walls. These crates can have a very large interior volume. Garments packaged in this manner can be transferred to trolley and rail systems once they reach retail distribution centers.

Generally, trolley and rail systems can transport garments along guided rail systems much like a belt conveyor system would move cartons throughout a facility. These rail systems are generally suspended above the floor. For example, a typical trolley system suspends garments about six feet above the ground. This height allows shorter length apparel such as shirts, blouses, and tops as well as longer length apparel such as formal dresses, gowns, and dress coats without dragging on the floor and becoming damaged. As can be appreciated, other trolley systems are known and are suitable for use with the systems and methods described herein.

Trolley and rail systems can increase the difficulty of inventory control. For example, the trolley and rail system infrastructure in many facilities is tightly interwoven to maximize building floor plans. In most facilities the inventory is closely arranged on side-by-side rail routing paths. Row upon row of trolley rails can be situated side-by-side allowing thousands of garments to be staged. As a result, a substantial number of items tagged with RFID transponders can be in very close proximity with one another, which can make RFID interrogation of individual items difficult or impractical.

SUMMARIES

A radio frequency identification (RFID) apparatus includes a housing, one or more RFID antennas, and an RFID reader. The housing includes a first opening, a second opening, and a cavity configured as a tunnel between the first opening and the second opening. The RFID antennas are disposed in the housing and configured to generate a radio frequency (RF) field substantially in the tunnel for interrogating RFID tags. The RFID reader is configured to receive an RFID signal from RFID tags on garments that are disposed in, or, in one embodiment of the present invention, in close proximity to, the tunnel. The RFID tags are activated by the RF field as they transit through the tunnel. The housing is configured to be positioned over a track that transports garments on hangers such that the garments on hangers transit through the tunnel of the housing.

A first method includes generating, by a plurality of RFID antennas disposed in a housing, an RF field substantially inside a tunnel in the housing. The method further includes transporting via a track system a garment on a hanger that includes an RFID tag through the tunnel, and receiving an RFID signal generated by the RFID tag which is activated by the RF field when the garment and RFID tag is disposed in, or in close proximity to, the tunnel.

A second method includes generating a broad RF field in a facility which includes a track for transporting garments on hangers. The track includes a plurality of trolleys that are each configured to suspend one or more garments on hangers from the track. The method further includes activating a plurality of trolley beacon RFID tags associated with at least a subset of the plurality of trolleys in the facility in response to the generated broad RF field. The method further includes identifying a trolley that includes a desired garment on hanger based on the RFID signals received from the activated trolley beacon RFID tags, locating the trolley that includes the desired garment on hanger, and identifying, on the trolley, the particular desired garment on hanger.

DETAILED DESCRIPTION

The systems and methods disclosed herein are described in detail by way of examples and with reference to FIGS. 1 to 6. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The present disclosure illustrates new modalities for RFID interrogation of objects such as garments on hangers. While the present specification often discusses apparel garments, the present invention is not limited to such and can be used for any other sort of object on a hanger such as an accessory like a purse, backpack, and/or belt. The systems and methods disclosed herein describe various aspects of structures for interrogating RFID tags of objects hung on hangers. Although the systems and methods described herein are particularly applicable to RFID systems and transponders, the structures and methodologies can be adapted for use with other types of radio tags, for example those used in Electronic Article Surveillance ("EAS") systems.

Known trolley and rail scanning systems typically often use barcode identification methods. As can be appreciated, barcode scanning equipment generally requires a clear line of sight to the barcode tag in order to capture the barcode data and barcodes tags generally need to be tagged in a consistent manner with the printed barcode facing the proper direction for consistent operation. As can be appreciated, if barcode tags are not uniformly disposed in specific locations and orientations across garments, associated barcode scanning equipment may not operate properly or require an increase in cost and complexity. For example, associated barcode scanning equipment may need to employ multidirectional scanning arrays to completely scan an entire garment. If any barcode tags are not able to be scanned, then the supply chain only has a record of the barcode tags from the last previously successful scan. In practical application, barcode identification methods often require associates to perform exhaustive searches for items that are not able to be scanned automatically by the barcode scanning equipment.

The present disclosure can eliminate many of these difficulties by use of an RFID garment on hanger reader. The RFID garment on hanger reader disclosed herein facilitates automatic or semi-automatically inventorying of garments on hangers for track and trolley systems with lower associated manpower costs than known barcode tag identification methods.

Figure 1:
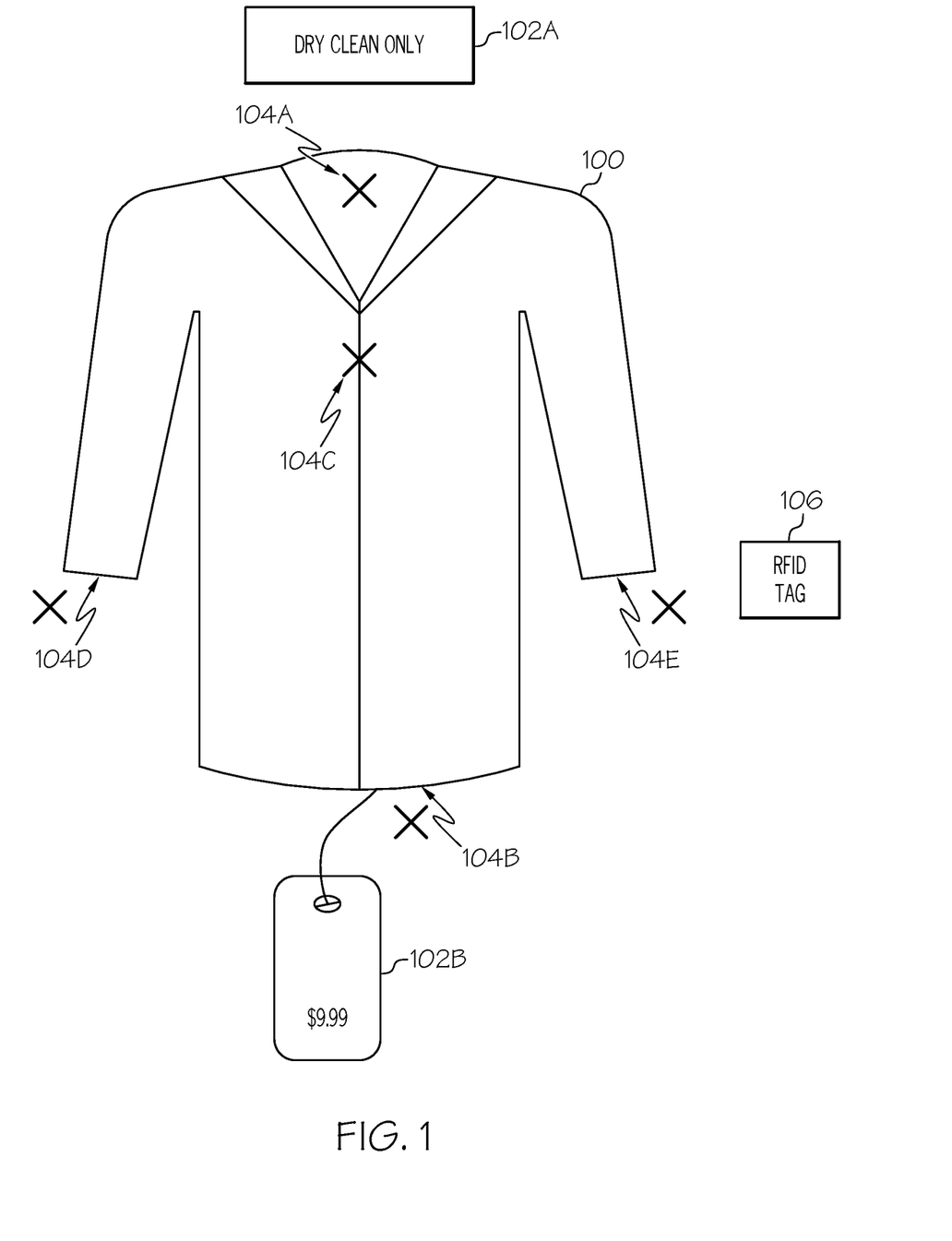
FIG. 1 depicts a diagram of example labels and label placements on garments according to an embodiment of the disclosure.

Referring now to FIG. 1, an example garment 100 and example tags 102A, 102B, 102C (collectively tags 102) are presented. It is important to note, that the present invention is not limited to any number of example tags. The tags 102, such as a hang tag 102A and sewn-in care label tag 1026, can be attached to the garment 100 in any suitable tag location, including but not limited to the collar 104A, the base hem 104B, one of the button holes 104C, or one of the sleeves 104D, 104E (collectively tag locations 104). The particular tag location 104 for any garment 100 can be based upon what the retailer determines to be the best means to display the garment 100 and present the price to the end consumer looking to purchase the garment 100. While the present invention illustrates the utilization of both a sew-in and hang tag, an embodiment presently contemplated can have either one or both types of example tags.

An RFID transponder 106 can be attached to one of the tags 102, or the garment 100 at any of the tag locations 104. The tag construction 102 can be any construction known in the art. In certain embodiments, the RFID transponder 106 can be attached to the garment 100 using the pin ticket tag attachment method as would be understood in the art. In such embodiments, a hang tag such as tag 102 and the RFID transponder 106 can generally hang loosely in a vertical orientation due to gravity. In other embodiments, the RFID transponder 106 can be integrated into one of the tags 102. For example, some retail and apparel manufacturers have adopted care or brand labels that include an RFID transponder 106 embedded in the material of the label, which may result in the RFID transponder 106 having a horizontal orientation.

The RFID transponder 106 on any particular garment 100 can be placed in various different positions on the garment 100 in addition to various different orientations. As can be appreciated, a suitable RFID reader would need to be able to handle any number of tag locations 104 and RFID transponder 106 orientations.

Garments on hangers further present challenges to RFID readers in terms of accomplishing a successful singulation when interrogating RFID transponders 106. As described above with regard to distribution warehouse inventories, garments on hangers may need to be interrogated when in the vicinity of a large number of other garments 100 that also have RFID transponders 106. In such conditions, simply mounting an antenna of an RFID reader in open air and operating a fixed RFID reader at high power, in order to cover all likely tag locations 104 on a garment 100, is not feasible. For example, such an implementation would result in every RFID transponder 106 being activated that is within the influence of the RF field emitted by the antenna. The close proximity to rows of other garments on hangers could result in the activation of multiple RFID transponders 106 simultaneously by a single interrogation by the RFID reader. Outside of performing a mass inventory cycle count, where large read fields may be desirable, such a system and method would not be valuable for interrogating individual garments 100.

Distribution centers may conduct RFID scanning audit functions both at the dock door receipt as well as outbound shipping. This can require individual garment 100 scanning accuracy in order to determine which garments 100 specifically have been received or shipped and matched to purchase orders.

Figure 2:
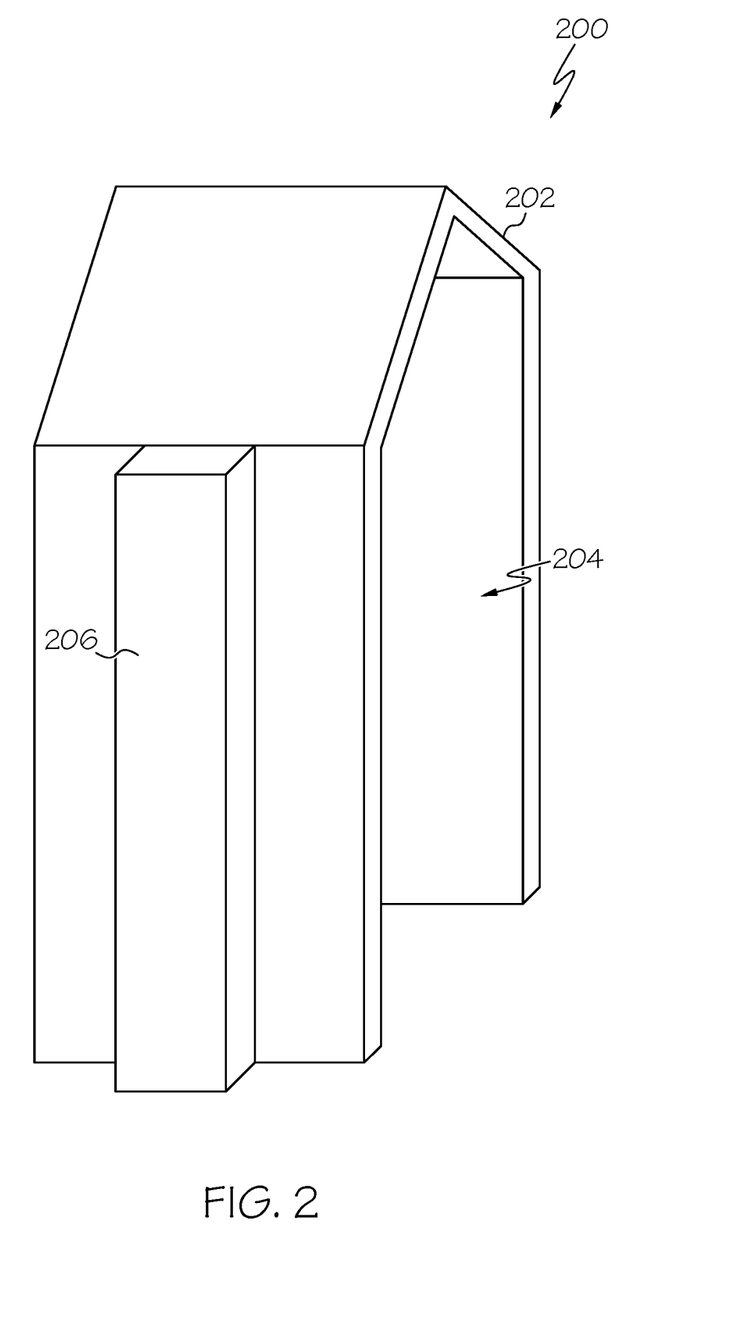
FIG. 2 depicts a diagram of an example radio frequency identification (RFID) reader for garments on hangers according to an embodiment of the disclosure.

An RFID garment on hanger reader is disclosed herein which can interrogate RFID tags on a single garment or a group of multiple garments on hangers. An example of an RFID garment on hanger reader 200 according to one embodiment is disclosed in FIG. 2. The disclosed RFID garment on hanger reader 200 can be configured as a self-standing rugged industrial metal housing 202 as illustrated in FIG. 2. The housing 202 includes openings on either end along with a cavity configured as a tunnel 204 or gateway that in one embodiment as arched. The tunnel 204 can be configured to envelope a section of a trolley rail system (not shown, see FIGS. 5 and 6). The RFID garment on hanger reader 200 can allow individual garments or clusters of garments on trolleys to pass through the tunnel 204. The tunnel 204 can include an open ended entry and exit so that garments can transit through the tunnel 204 unimpeded.

The tunnel 204 and antennas 206 are configured to focus the emitted RF signal and provide RF signal control so as to prevent reads of other RFID tagged items that are not proximate to, or directly inside of, the tunnel 204. The present invention contemplates that the housing 202 has at least one component, recognizable by one skilled in the art, that can reduce RF emissions outside of the housing 202 and focus RF fields inside of the tunnel 204 of the housing 202. For instance, in certain embodiments, the housing 202 can be configured to have a wall depth sufficient to attenuate RFID emissions, such as, but not limited to three to four inches thick in certain embodiments, the housing 202 can also, or alternatively, include signal mitigation material within one or more of the walls to retain and capture RFID emissions. The housing 202 can include mounting points for one or more antennas and structures disposed on the housing 202 for containing the antennas 206. The structures disposed on the housing 202 can reduce RF emissions outside of the housing 202 that could activate nearby RFID tags and focus RF fields inside of the tunnel 204 where RFID tags are intended to be scanned. Examples of suitable signal mitigation material can include metals, dielectric materials, conductive plastics, and other materials known in the art. In certain embodiments, the antennas 206 can be set back or nested in the housing 202 to focus the energy emitted by the antennas and diminish any inherent side lobe energy that the antennas 206 may emit. In certain embodiments, the antennas 206 can be set in signal mitigation material for similar reasons. As can be appreciated, such features can prevent activation of nearby RFID tags that are not transiting through the tunnel 204.

Figure 3:
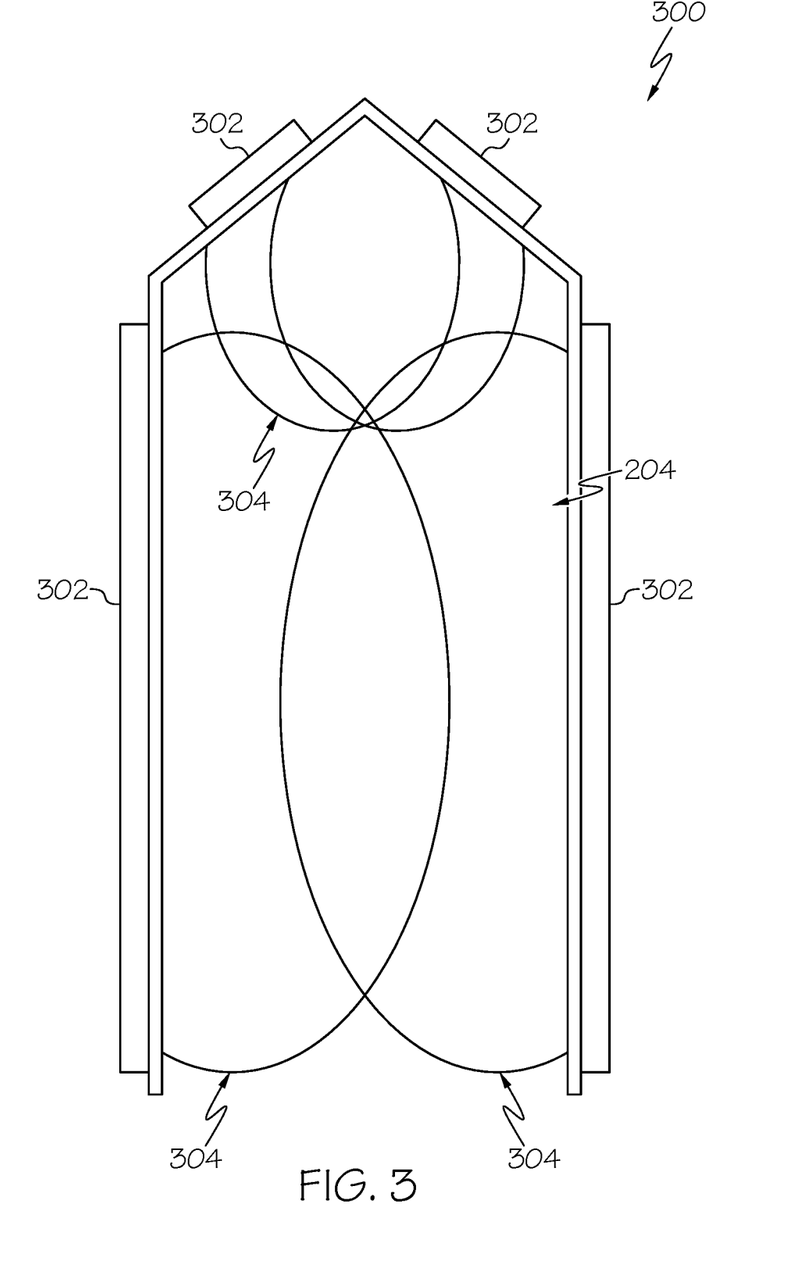
FIG. 3 depicts a diagram of example antenna placement locations for an RFID reader for garments on hangers according to an embodiment of the disclosure.

Referring also to FIG. 3, a side view of a housing 300 is presented that illustrates example antenna placement locations 302. The antenna placement locations 302 and antennas can be configured to generate overlapping RF fields 304 inside of the tunnel 204. Advantageously, proper antenna placement can project the RF fields 304 in a narrow field from the top to the bottom of the tunnel 204. The overlapping RF fields 304 can ensure that the RFID transponders on each of the garments can be interrogated as each garment passes through the tunnel 204. Advantageously, proper RF fields 304 can reduce the possibility of an under read due to limited power, or an over read when too much power is applied in an attempt to compensate for under read performance. In certain embodiments, the RF fields 304 can also scan RFID tags associated with trolleys that carry one or more garments on an associated track (not shown, see FIGS. 5 and 6). As can be appreciated, the antenna placement locations 302 depicted in FIG. 3 are not limiting and other antenna arrangements can also be suitable.

Figure 4:
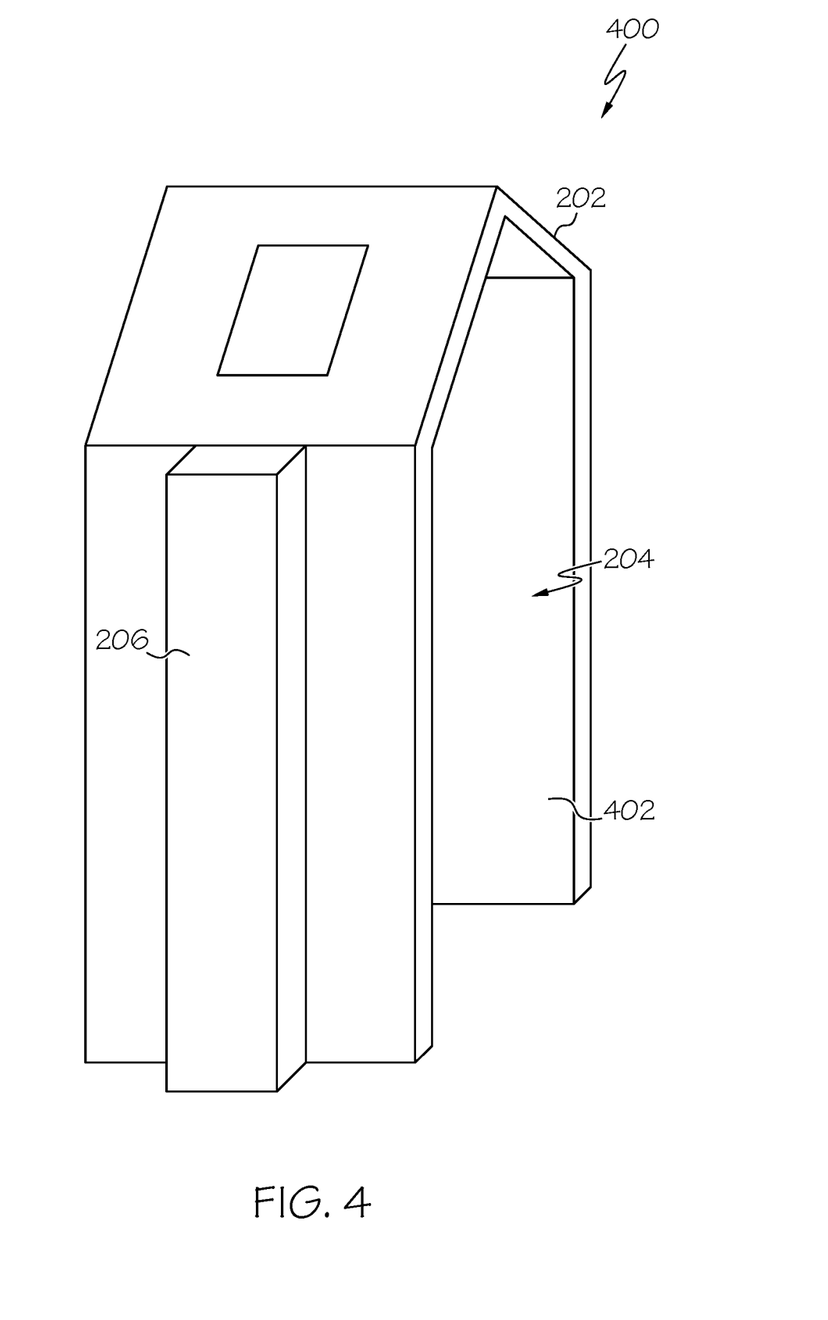
FIG. 4 depicts a diagram of an example RFID reader for garments on hangers that includes a smooth interior cavity according to an embodiment of the disclosure.

In certain embodiments, the RFID garment on hanger reader can minimize damage to garments. For example, FIG. 4 depicts the tunnel 204 of the RFID garment on hanger reader 400 including a smooth interior liner 402. In certain such embodiments, the liner 402 can extend to outside portions of the housing 202, including, for example, the edges of the housing 202 where garments may contact the housing 202. The liner 402 can be constructed of any suitable material including but not limited to, for example polyethylene or Teflon®, as would be understood in the art. The liner 400 can reduce or eliminate the possibility of garments snagging or marring as they pass through the tunnel 204. As can be further appreciated, garments on hangers may swing from the hook of the hanger during movement through the tunnel 204, thereby allowing a garment to brush or drag against tunnel 204 or sides of the housing 202. The liner 402 can be shaped to provide a smooth surface for garments to pass through the tunnel 204 without being damaged or generating drag.

Figure 5:
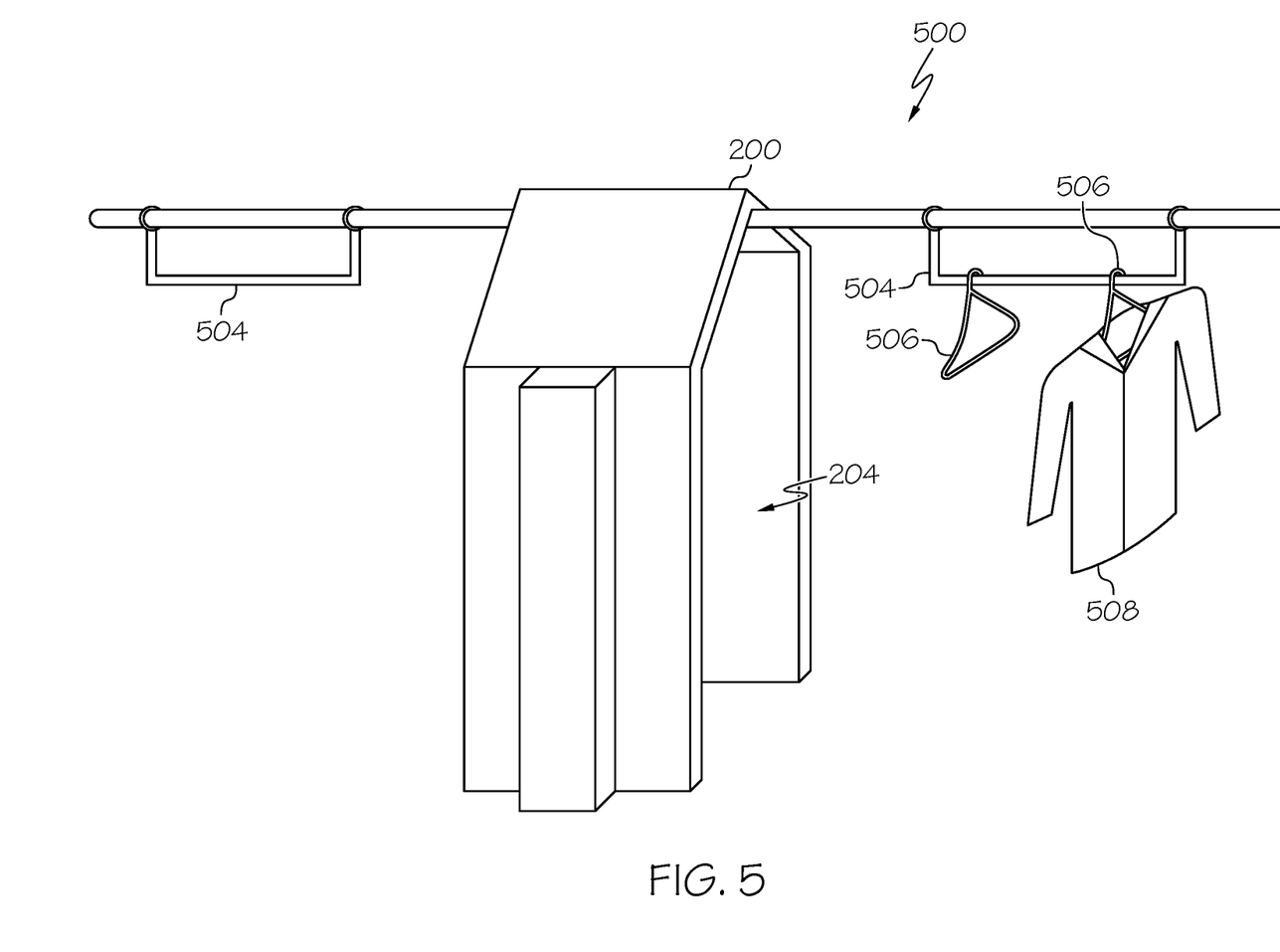
FIG. 5 depicts a diagram of an example rail system, trolley, and RFID reader for garments on hangers according to an embodiment of the disclosure.

FIG. 5 depicts an example of a track and trolley system 500. The track and trolley system includes segments of track 502 and trolleys 504 that transport garments 508 on hangers 506. The track 502 can be configured to transport garments 508 on hangers 506 around a warehouse or factory via the trolleys. The RFID garment on hanger reader 200 can be disposed over the segment of track 502 so that trolleys 504 holding one or more garments 508 on hangers 506 transit through the tunnel 204. RFID tags associated with each of the garments 508 can be scanned by the RFID garment on hanger reader 200 when transiting through the tunnel 204. In certain embodiments, a segment of the track 502 can be attached to the RFID garment on hanger reader 200 either as an integral part or for providing support for the segment of the track 502.

In one embodiment presently contemplates, The housing 300 sits over top of the existing track and rail system. The housing may be secured to a floor portion to keep the system from moving.

Figure 6:
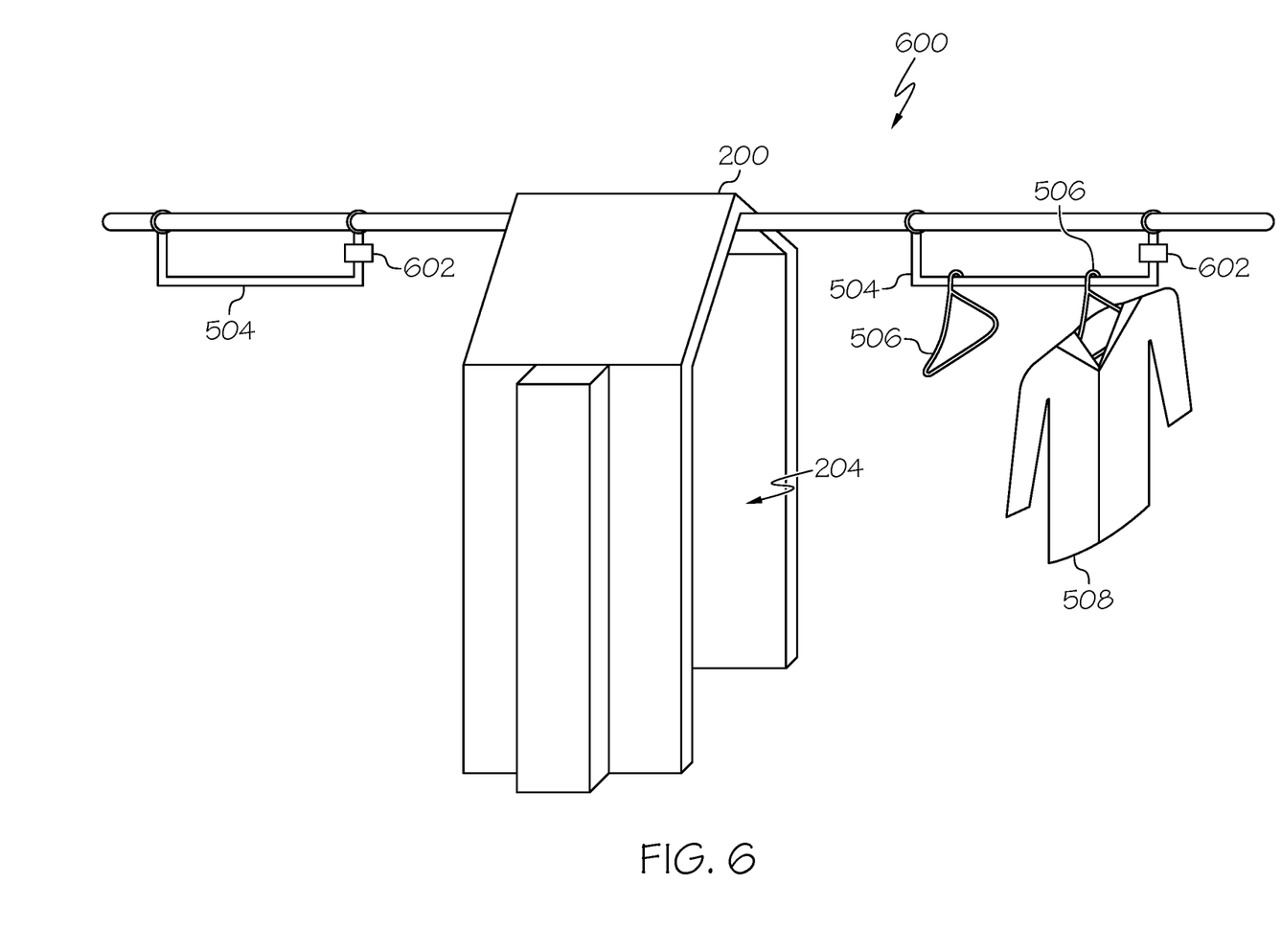
FIG. 6 depicts a diagram of an example rail system, trolley with an included trolley beacon tag, and RFID reader for garments on hangers according to an embodiment of the disclosure.

FIG. 6 depicts an example track and trolley system 600 further including trolley beacon tags 602. In such embodiments, the trolley beacon RFID tags 602 can permit identification and inventorying of the trolleys 504, for example by providing a unique identification number or label for each trolley 504. Garments 508 that are scanned by the RFID garment on hanger reader 200 while one a trolley 504 having a trolley beacon RFID tag 602 that can be associated with that trolley 504 for improved inventorying and other supply chain operations.

RFID technology can allow for a broad projection of RF energy to scan a generalized area. However, individual RFID tags on garments 508 on hangers 506 typically have a small profile and therefore may be difficult to locate in a facility using a broad RF scan. A facility may have thousands of garments 508 on hangers 506 densely packed into a small area. This can not only make it difficult to energize each of the RFID tags on the garments, but can make it prohibitively difficult to pinpoint the exact location of an individual garment even if the associated RFID tag is energized.

The larger profile of a trolley beacon RFID tags 602 can provide enhanced sensitivity to RF fields. Additionally, positioning the trolley beacon RFID tags 602 physically above the garments 508 on hangers 506 provides better RF field reception by the trolley beacon RFID tags 602 than the individual RFID tags on the garments 508 below. This increased sensitivity can facilitate locating trolleys 504 using a broad generalized scan of an area of a facility. Once the desired trolley 504 is identified by its trolley beacon RFID tag 602, the individual desired garment 508 on hanger 506 can be more easily located and identified on the trolley 504. This can allow an operator to quickly find individual garments 508 and can greatly reduce the amount of time required to locate a specific item in a facility. In certain embodiments, the trolley beacon RFID tags 602 can be used in conjunction with the RFID garment on hanger reader 200 described herein by moving the identified trolley to the RFID garment on hanger reader 200 and identifying the desired garment inside the RFID garment on hanger reader 200.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A radio frequency identification (RFID) apparatus, comprising:
    a housing including a first opening, a second opening, and a cavity configured as a tunnel between the first opening and the second opening, and wherein the housing is disposed over a track configured to transport one or more garments on hangers through the tunnel;
    at least one RFID antenna disposed in the housing configured to generate a radio frequency (RF) field substantially in the tunnel for interrogating RFID tags;
    an RFID reader configured to receive an RFID signal from an RFID tag disposed in, or proximate to, the tunnel that is activated by the RF field;
    a plurality of trolleys, wherein each trolley of the plurality of trolleys is suspended from the track and is adapted to suspend one or more garments on hangers; and
    a beacon RFID tag secured to each trolley of the plurality of trolleys, wherein the beacon RFID tag is associated with at least a subset of the plurality of trolleys for identifying a trolley having a desired garment out of the one or more garments on hangers.

2. The RFID apparatus of claim 1, further comprising: a segment of track configured to transport the one or more garments on hangers through the tunnel.

3. The RFID apparatus of claim 1, further comprising:
    a smooth liner disposed in the tunnel and configured to prevent damage to the one or more garments on hangers during transit through the tunnel.

4. The RFID apparatus of claim 1, further comprising:
    a plurality of RFID antennas disposed in the housing configured to generate a broad RF field in the tunnel,
    wherein the broad RF field is configured to activate the beacon RFID tag associated with the subset of at least one trolley.

5. The RFID apparatus of claim 1, wherein the at least one RFID antenna disposed in the housing is configured to generate an RF field within the tunnel for activating the beacon RFID tag located above the garments on hangers.

6. A method for identifying and locating one or more garments in
    facility comprising a track system for transporting garments on hangers, the method comprising:
    generating, a broad RF field in the facility comprising a track system for transporting one or more garments on hangers;
    transporting the one or more garments on hangers through a tunnel in the facility via a track system configured to transport the one or more garments on hangers, wherein each garment on a hanger comprises an RFID tag, and wherein the one more garments on hangers are suspended from a plurality of trolleys, wherein each trolley of the plurality of trolleys is suspended from the track system and is secured with a beacon RFID tags associated with at least a subset of the plurality of trolleys;
    activating each beacon RFID tag in response to the broad RF field; and
    identifying and locating a trolley with desired garments from the one or more garments on hangers based on RFID signals received from activated beacon RFID tags secured on said trolleys.

7. The method of claim 6, further comprising:
    positioning a housing comprising the tunnel over the track system such that a segment of track passes through the tunnel.

* * * * *